June 3, 1952  P. E. HAWKINSON  2,598,791
TIRE TREADING MOLD
Filed Oct. 25, 1947  2 SHEETS—SHEET 1
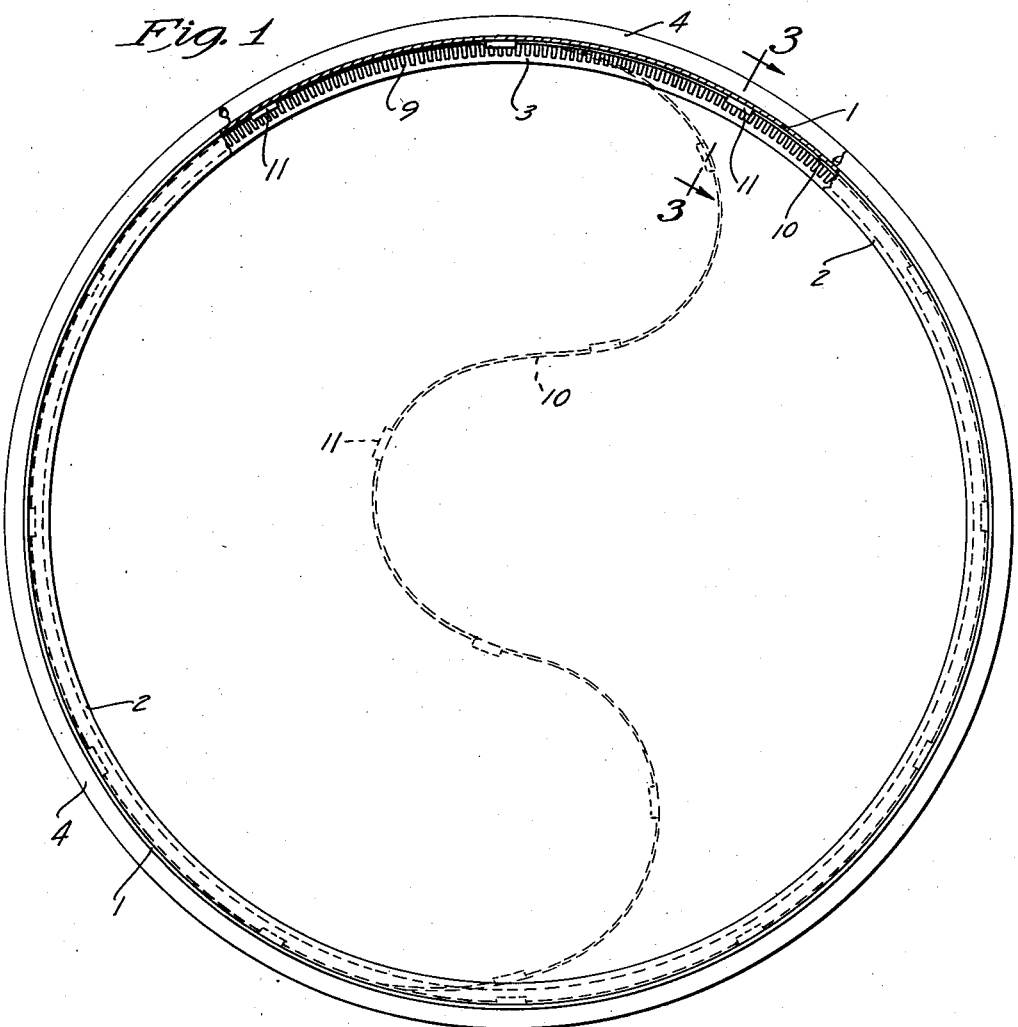
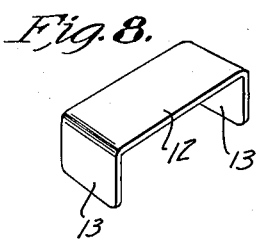
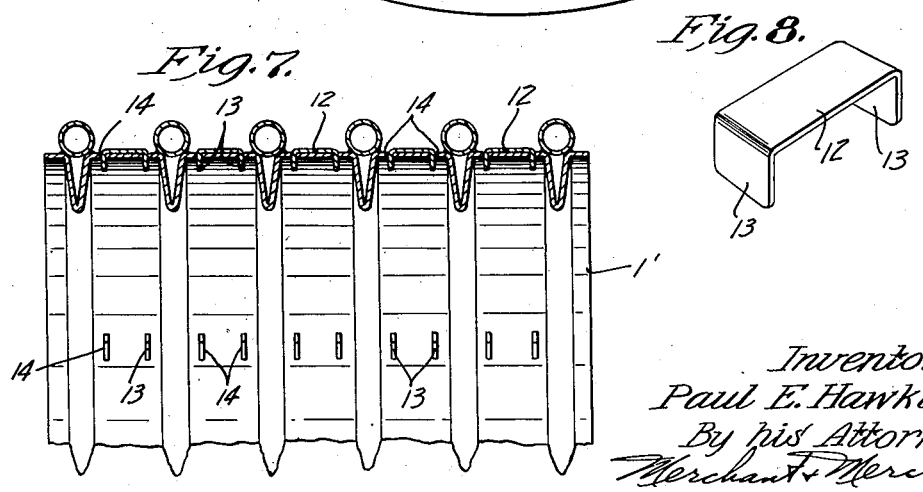
Inventor
Paul E. Hawkinson
By his Attorneys
Merchant & Merchant

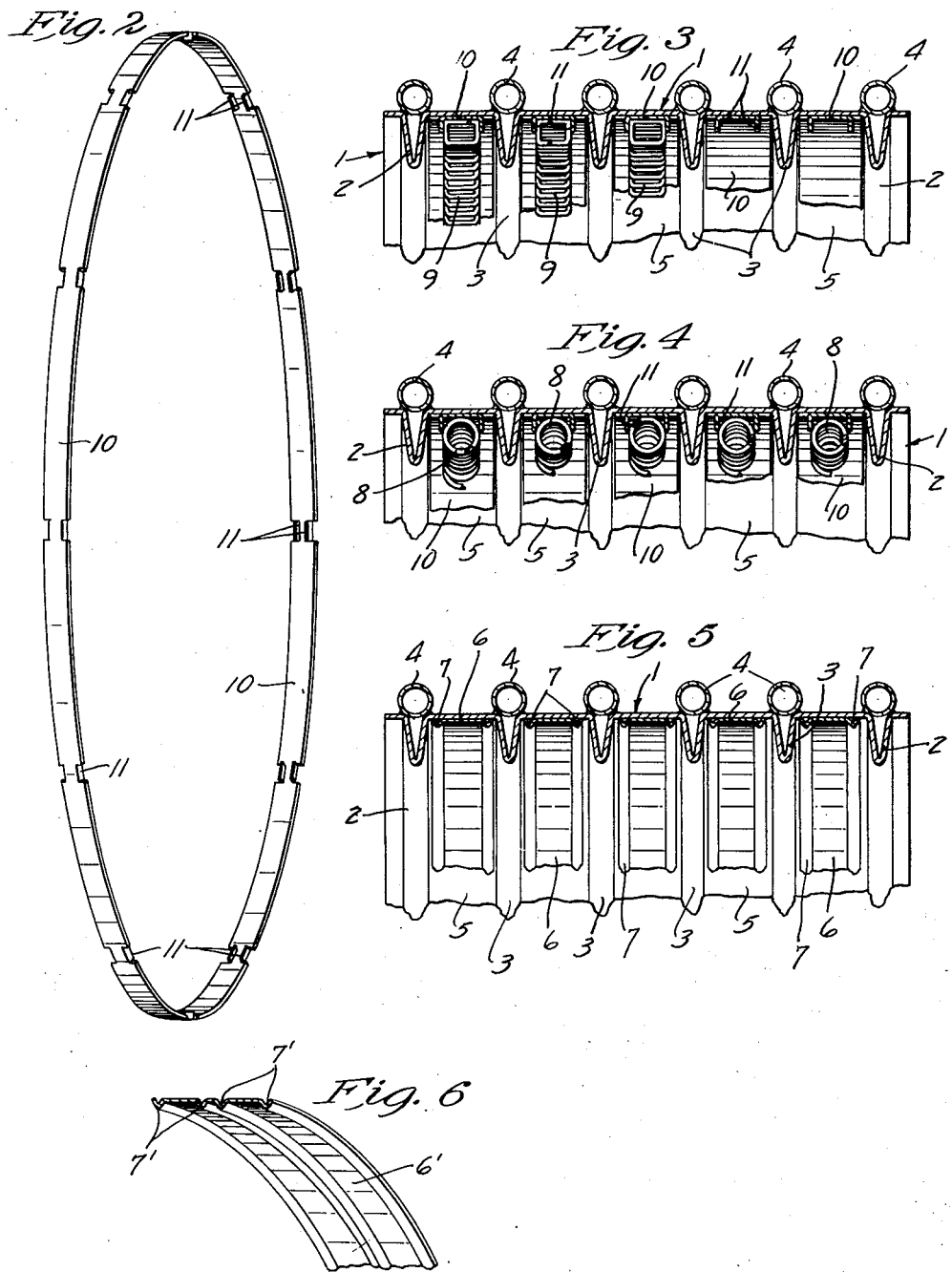

Patented June 3, 1952

2,598,791

UNITED STATES PATENT OFFICE 2,598,791

TIRE TREADING MOLD

Paul E. Hawkinson, Minneapolis, Minn., assignor to Paul E. Hawkinson Company, Minneapolis, Minn., a corporation of Minnesota Application October 25, 1947, Serial No. 782,111

8 Claims. (Cl. 18—18)

My invention relates to improvements in tire treading molds and, more particularly, to improvements in tire treading molds of the type disclosed and broadly claimed in my earlier Patent No. 1,917,262.

Specifically, the object of my invention is to provide means for retaining coiled wire, which is placed within the tread of a pneumatic tire to impart additional skid resistance thereto, in a desired position both before and during the vulcanizing operation.

The above and still further objects of my invention will become apparent from the following detailed specification, appended claims, and attached drawings.

Referring to the drawings, wherein like characters indicate like parts throughout the several views:

Fig. 1 is a side elevation of a tire mold, as disclosed in my prior patent above-referred to, having applied thereto a plurality of circumferentially-extended wire coils, some parts being broken away and some parts shown in section;

Fig. 2 is a view in perspective, illustrating one form of wire coil centering and holding means used in accordance with my invention;

Fig. 3 is an enlarged fragmentary view in section taken on the line 3—3 of Fig. 1;

Fig. 4 is a view corresponding to Fig. 3, but showing my invention as applied to wire coils of somewhat different shape;

Fig. 5 is a view corresponding to Fig. 3, but illustrating the preferred form of my invention;

Fig. 6 is a fragmentary sectional view in perspective, illustrating a further modification;

Fig. 7 is a view corresponding to Fig. 2, but showing a still further modification of my invention; and Fig. 8 is a perspective view of one of the centering elements of Fig. 6.

Referring with greater particularity to the drawings, the numeral 1 indicates an integral or unbroken sheet metal mold which is cylinder-like in cross section, which is provided adjacent its opposite edges with circumferentially-extending radially inwardly projecting continuous confining flanges 2 and with laterally-spaced, circumferentially-extending unbroken tread design-forming ribs 3 intermediate the flanges 2. Mold 1 is provided at its external periphery with preferably spirally wound heating coil 4 through which steam or other heating fluid is adapted to be circulated. Confining flanges 2 and design-forming ribs 3 cooperate to define channels 5, each of which produces endless ribs, not shown, in the tire tread to be formed therein.

When endless coils of wire are placed within the treads of pneumatic tires for the purpose of imparting additional skid resistance thereto, it is important that the sides of the coils be spaced sufficiently from the sides of the rubber ribs within which they are imbedded, to prevent their working themselves out of the tire through the sides of the ribs. Therefore, it is important that the wire coils be maintained in a set position not only prior to the vulcanization, but also during the period of vulcanization.

To accomplish this object, I provide, as indicated, in the preferred embodiment illustrated in Fig. 5, resilient sheet metal bands 6 of substantially the same width as a given channel 5 at its base, which are placed within the channels 5 so that they are in tight contact with the internal periphery of the mold 1. Each of the bands 6 is provided adjacent its opposite edges with an inwardly-projecting flange 7, preferably and as shown, of V-shaped cross section. The band 6 may be secured to the internal periphery of the mold 1, within the channels 5, by soldering, welding, or the like. It will be clear that, when a coil of wire, either round, as indicated by the numeral 8 in Fig. 4, or rectangular, as indicated by the numeral 9 in Fig. 3, is placed within the channel 5 and in contact with the band 6, it will be centered within the channel 5 by the flanges 7—spaced sufficiently from the sides of the channel to insure adequate rubber being interposed between the side edges of the wire coil and the sides of the rubber tread rib (to be formed within the channel 5) to prevent the coil from working out of the sides of the ribs.

In Figs. 2, 3, and 4, I have shown a modified form of band 10 having short flanges 11 bent at right angles thereto at circumferentially-spaced points. This band 10 may be an endless band and, if so, may be inserted into the channels 5 of the mold 1 by contracting the circumference of the same by the method indicated by dotted lines in Fig. 1. In the use of the band 10, it should be obvious that either of the coils 8 or 9 are held against lateral displacement by the flanges 11 between which they are placed.

In Fig. 6, I have shown a band 6' having formed therein laterally-spaced pairs of circumferentially-extended inwardly radially projecting wire coil positioning flanges 7'. This type of band may be used in molds where the channels 5 are of greater width and where it is desired to use more than a single wire coil of the type indicated by the numerals 8 and 9.

In Figs. 6 and 7, I have shown a still further modified form of my invention, wherein U-shaped staple-like elements 12, preferably formed from sheet metal or the like, have their free ends 13 projecting radially inwardly through apertures 14 in the peripheral portion of the mold 1' at circumferentially-spaced points. The intermediate portions of the elements 12 are secured to the exterior of the mold by welding or the like.

What I claim is:

1. A tire retreading device comprising a cylindrical mold member having a plurality of axially spaced inwardly directed generally parallel circumferential ribs for molding the tread design of a tire, two axially spaced and circumferentially arranged flanges lying between each adjacent pair of ribs and extending radially inwardly from the bases of said ribs to a lesser extent than said ribs and supported by said member, each of said flanges being substantially equally spaced from its adjacent rib of said pair and being shaped to engage with a side of a wire coil skid resisting means to be embedded in said tread and for positioning same centrally of the channel.

2. A tire retreading device comprising a cylindrical mold member having a plurality of axially spaced inwardly directed generally parallel circumferential design-forming ribs, and means carried by said member and disposed between each two adjacent ribs constructed and arranged to support and center a wire coil skid-resisting means between each two adjacent ribs, said supporting and centering means comprising a band of sheet material having radially inwardly projecting portions shaped to embrace the coil between said portions.

3. A tire retreading device comprising a cylindrical mold member having a plurality of axially spaced inwardly directed generally parallel circumferential design-forming ribs, and means carried by said member and disposed between each two adjacent ribs constructed and arranged to support and center a wire coil skid-resisting means between each two adjacent ribs, said coil supporting and centering means comprising a unitary band having marginal portions thereof struck up to provide spaced flanges.

4. The structure defined in claim 3 wherein relatively short marginal portions of the band are struck up at circumferentially spaced points thereon to provide coil retaining flanges.

5. The structure defined in claim 3 wherein the struck up marginal portions of the band are in the form of longitudinal ribs.

6. A tire retreading device comprising a cylindrical mold member having a plurality of axially spaced inwardly directed generally parallel circumferential design-forming ribs, and means carried by said member and disposed between each two adjacent ribs constructed and arranged to support and center a wire coil skid-resisting means between each two adjacent ribs, said coil supporting and centering means comprising U-shaped staple elements whose bases are supported by said member and the legs thereof project radially inwardly between the ribs of the member.

7. The structure defined in claim 6 wherein the bases of the U-shaped elements lie on the outer surface of the cylindrical member and whose legs extend radially through apertures in the member.

8. A tire retreading device comprising a cylindrical mold member having a plurality of axially spaced inwardly directed generally parallel circumferential design-forming ribs, and means carried by said member and disposed between each two adjacent ribs constructed and arranged to support and center a wire coil skid-resisting means between each two adjacent ribs, said coil supporting and centering means comprising a plurality of rows of axially spaced and circumferentially arranged flanges extending inwardly from the bases of said ribs.

PAUL E. HAWKINSON.

REFERENCES CITED

The following references are of record in the file of this patent:

UNITED STATES PATENTS

| Number | Name | Date |
| --- | --- | --- |
| 2,024,888 | Shaw | Dec. 17, 1935 |
| 2,034,618 | Hawkinson | Mar. 17, 1936 |
| 2,155,906 | Rihn et al. | Apr. 25, 1939 |
| 2,339,696 | Hawkinson | Jan. 18, 1944 |